(12) United States Patent
Carlson (10) Patent No.: US 12,502,548 B2
(45) Date of Patent: Dec. 23, 2025

(54) REDUCING ELECTROSENSATION WHILST TREATING A SUBJECT USING ALTERNATING ELECTRIC FIELDS BY USING LARGER CATHODES AND SMALLER ANODES

(71) Applicant: Novocure GmbH, Root (CH)

(72) Inventor: Kristen W. Carlson, Concord, MA (US)

(73) Assignee: Novocure GmbH, Baar (CH)

( * ) Notice: Subject to any disclaimer, the term of this patent is extended or adjusted under 35 U.S.C. 154(b) by 341 days.

(21) Appl. No.: 18/089,798

(22) Filed: Dec. 28, 2022

(65) Prior Publication Data

US 2023/0201616 A1    Jun. 29, 2023

Related U.S. Application Data

(60) Provisional application No. 63/294,673, filed on Dec. 29, 2021.

(51) Int. Cl.
    *A61N 1/40*          (2006.01)
    *A61N 1/36*          (2006.01)

(52) U.S. Cl.
    CPC ........... *A61N 1/40* (2013.01); *A61N 1/36002* (2017.08); *A61N 1/3616* (2013.01); *A61N 1/3615* (2013.01)

(58) Field of Classification Search
None
See application file for complete search history.

(56) References Cited

U.S. PATENT DOCUMENTS

| | | | |
|---|---|---|---|
| 4,608,985 | A | 9/1986 | Crish et al. |
| 6,868,289 | B2 | 3/2005 | Palti |
| 7,016,725 | B2 | 3/2006 | Palti |
| 7,089,054 | B2 | 8/2006 | Palti |
| 7,136,699 | B2 | 11/2006 | Palti |

(Continued)

FOREIGN PATENT DOCUMENTS

| | | |
|---|---|---|
| EP | 3381507 A1 | 10/2018 |
| EP | 3623004 A1 | 3/2020 |
| WO | 2020131857 A1 | 6/2020 |

OTHER PUBLICATIONS

International Search Report and Written Opinion issued in application No. PCT/IB2022/062822 dated Mar. 13, 2023.

(Continued)

*Primary Examiner* — Michael W Kahelin
(74) *Attorney, Agent, or Firm* — Potomac Law Group, PLLC (57) ABSTRACT

When treating a subject using alternating electric fields (e.g., using TTFields to treat a tumor), some subjects experience an electrosensation effect. This electrosensation can be reduced or eliminated by applying a plurality of electrical pulses between two sets of electrode elements positioned on opposite sides of the target region. During the pulses, one set of electrode elements operate as the anode and the other set of electrode elements operate as the cathode. Electrosensation is reduced or eliminated because the collective area of the cathode is at least twice as large as the anode. An electrical signal with the opposite polarity is also applied to charge-balance the plurality of electrical pulses. The plurality of electrical pulses has an average amplitude that is at least twice the average amplitude of the charge-balancing signal.

23 Claims, 5 Drawing Sheets

(56) References Cited

U.S. PATENT DOCUMENTS

| | | |
|---|---|---|
| 7,333,852 B2 | 2/2008 | Palti |
| 7,467,011 B2 | 12/2008 | Palti |
| 7,519,420 B2 | 4/2009 | Palti |
| 7,565,205 B2 | 7/2009 | Palti |
| 7,565,206 B2 | 7/2009 | Palti |
| 7,599,745 B2 | 10/2009 | Palti |
| 7,599,746 B2 | 10/2009 | Palti |
| 7,706,890 B2 | 4/2010 | Palti |
| 7,715,921 B2 | 5/2010 | Palti |
| 7,805,201 B2 | 9/2010 | Palti |
| 7,890,183 B2 | 2/2011 | Palti et al. |
| 7,912,540 B2 | 3/2011 | Palti |
| 7,917,227 B2 | 3/2011 | Palti |
| 8,019,414 B2 | 9/2011 | Palti |
| 8,027,738 B2 | 9/2011 | Palti |
| 8,170,684 B2 | 5/2012 | Palti |
| 8,175,698 B2 | 5/2012 | Palti et al. |
| 8,229,555 B2 | 7/2012 | Palti |
| RE43,618 E | 8/2012 | Palti |
| 8,244,345 B2 | 8/2012 | Palti |
| 8,406,870 B2 | 3/2013 | Palti |
| 8,447,395 B2 | 5/2013 | Palti et al. |
| 8,447,396 B2 | 5/2013 | Palti et al. |
| 8,465,533 B2 | 6/2013 | Palti |
| 8,706,261 B2 | 4/2014 | Palti |
| 8,715,203 B2 | 5/2014 | Palti |
| 8,718,756 B2 | 5/2014 | Palti |
| 8,764,675 B2 | 7/2014 | Palti |
| 9,023,090 B2 | 5/2015 | Palti |
| 9,023,091 B2 | 5/2015 | Palti |
| 9,039,674 B2 | 5/2015 | Palti et al. |
| 9,056,203 B2 | 6/2015 | Palti et al. |
| 9,440,068 B2 | 9/2016 | Palti et al. |
| 9,655,669 B2 | 5/2017 | Palti et al. |
| 9,750,934 B2 | 9/2017 | Palti et al. |
| 9,910,453 B2 | 3/2018 | Wasserman et al. |
| 10,188,851 B2 | 1/2019 | Wenger et al. |
| 10,441,776 B2 | 10/2019 | Kirson et al. |
| 10,779,875 B2 | 9/2020 | Palti et al. |
| 10,967,167 B2 | 4/2021 | Hagemann et al. |
| 11,103,698 B2 | 8/2021 | Chang et al. |
| 11,191,956 B2 | 12/2021 | Giladi et al. |
| 2004/0176804 A1 | 9/2004 | Palti |
| 2006/0167499 A1 | 7/2006 | Palti |
| 2006/0276858 A1 | 12/2006 | Palti |
| 2007/0225766 A1 | 9/2007 | Palti |
| 2007/0239213 A1 | 10/2007 | Palti |
| 2009/0076366 A1 | 3/2009 | Palti |
| 2009/0270943 A1 | 10/2009 | Maschino |
| 2012/0029419 A1 | 2/2012 | Palti |
| 2012/0071950 A1* | 3/2012 | Archer ............... A61N 1/36125 607/66 |
| 2012/0283726 A1 | 11/2012 | Paiti |
| 2014/0277259 A1 | 9/2014 | Rosenberg et al. |
| 2014/0330268 A1 | 11/2014 | Palti et al. |
| 2017/0113047 A1* | 4/2017 | Chang ................. A61N 1/3615 |
| 2017/0120041 A1 | 5/2017 | Wenger et al. |
| 2017/0215939 A1 | 8/2017 | Palti et al. |
| 2017/0281934 A1 | 10/2017 | Giladi et al. |
| 2018/0001075 A1 | 1/2018 | Kirson et al. |
| 2018/0008708 A1 | 1/2018 | Giladi et al. |
| 2018/0050200 A1 | 2/2018 | Wasserman et al. |
| 2018/0110992 A1 | 4/2018 | Parramon et al. |
| 2018/0160933 A1 | 6/2018 | Urman et al. |
| 2018/0202991 A1 | 7/2018 | Giladi et al. |
| 2018/0280687 A1 | 10/2018 | Carter et al. |
| 2019/0117956 A1 | 4/2019 | Wenger et al. |
| 2019/0117963 A1 | 4/2019 | Travers et al. |
| 2019/0224474 A1 | 7/2019 | Yang et al. |
| 2019/0308016 A1 | 10/2019 | Wenger et al. |
| 2019/0329039 A1* | 10/2019 | Marnfeldt .......... A61N 1/36164 |
| 2020/0001069 A1 | 1/2020 | Kirson et al. |
| 2020/0009376 A1 | 1/2020 | Chang et al. |
| 2020/0009377 A1 | 1/2020 | Chang et al. |
| 2020/0016067 A1 | 1/2020 | Gotlib et al. |
| 2020/0023179 A1 | 1/2020 | Bomzon et al. |
| 2020/0061360 A1 | 2/2020 | Hagemann et al. |
| 2020/0061361 A1 | 2/2020 | Hagemann et al. |
| 2020/0069937 A1 | 3/2020 | Naveh et al. |
| 2020/0078582 A1 | 3/2020 | Alon et al. |
| 2020/0108031 A1 | 4/2020 | Borst et al. |
| 2020/0114141 A1 | 4/2020 | Bomzon et al. |
| 2020/0114142 A1 | 4/2020 | Bomzon et al. |
| 2020/0121728 A1 | 4/2020 | Wardak et al. |
| 2020/0129761 A1 | 4/2020 | Bomzon et al. |
| 2020/0146586 A1 | 5/2020 | Naveh et al. |
| 2020/0155835 A1 | 5/2020 | Wasserman et al. |
| 2020/0171297 A1 | 6/2020 | Kirson et al. |
| 2020/0179512 A1 | 6/2020 | Giladi et al. |
| 2020/0219261 A1 | 7/2020 | Shamir et al. |
| 2020/0269037 A1 | 8/2020 | Hagemann et al. |
| 2020/0269041 A1 | 8/2020 | Zeevi et al. |
| 2020/0368525 A1 | 11/2020 | Maag et al. |
| 2020/0384266 A1* | 12/2020 | Wang .................. A61K 31/7105 |
| 2021/0023372 A1* | 1/2021 | Musallam ............ A61K 31/375 |
| 2021/0031031 A1 | 2/2021 | Wasserman et al. |
| 2021/0038584 A1 | 2/2021 | Voloshin-Sela |
| 2021/0060334 A1 | 3/2021 | Avraham et al. |
| 2021/0069503 A1 | 3/2021 | Tran et al. |
| 2021/0138233 A1 | 5/2021 | Deslauriers |
| 2021/0162228 A1 | 6/2021 | Urman et al. |
| 2021/0187277 A1 | 6/2021 | Wasserman et al. |
| 2021/0196348 A1 | 7/2021 | Wasserman |
| 2021/0199640 A1 | 7/2021 | Patel et al. |
| 2021/0203250 A1 | 7/2021 | Wasserman |
| 2021/0268247 A1 | 9/2021 | Story et al. |
| 2021/0299440 A1 | 9/2021 | Deslauriers et al. |
| 2021/0308446 A1 | 10/2021 | Alon et al. |
| 2021/0330950 A1 | 10/2021 | Hagemann et al. |
| 2021/0346694 A1 | 11/2021 | Wasserman et al. |
| 2021/0379362 A1 | 12/2021 | Smith et al. |
| 2021/0408383 A1 | 12/2021 | Kalra et al. |
| 2022/0095997 A1 | 3/2022 | Wasserman |
| 2022/0096821 A1 | 3/2022 | Kirson et al. |
| 2022/0118249 A1 | 4/2022 | Bomzon et al. |
| 2022/0161028 A1 | 5/2022 | Giladi et al. |
| 2022/0193435 A1 | 6/2022 | Wasserman et al. |
| 2022/0233848 A1* | 7/2022 | Gad .................. A61N 1/37247 |
| 2022/0267445 A1 | 8/2022 | Tran et al. |
| 2022/0280787 A1 | 9/2022 | Bomzon et al. |
| 2022/0288395 A1 | 9/2022 | Voloshin-Sela et al. |
| 2022/0313992 A1 | 10/2022 | Wasserman |
| 2022/0323753 A1 | 10/2022 | Voloshin-Sela et al. |
| 2023/0000384 A1 | 1/2023 | Wasserman et al. |
| 2023/0001197 A1 | 1/2023 | Wasserman et al. |
| 2023/0001221 A1 | 1/2023 | Farber |
| 2023/0009366 A1 | 1/2023 | Voloshin-Sela et al. |
| 2023/0019638 A1 | 1/2023 | Wasserman |
| 2023/0037806 A1 | 2/2023 | Wasserman et al. |
| 2023/0043071 A1 | 2/2023 | Wasserman et al. |

OTHER PUBLICATIONS

Koivuniemi et al., "Asymmetric Versus Symmetric Pulses for Cortical Microstimulation," IEEE, vol. 19, No. 5, pp. 468-476, Oct. 2011.

* cited by examiner

REDUCING ELECTROSENSATION WHILST TREATING A SUBJECT USING ALTERNATING ELECTRIC FIELDS BY USING LARGER CATHODES AND SMALLER ANODES

CROSS REFERENCE TO RELATED APPLICATIONS

This application claims the benefit of U.S. Provisional Application 63/294,673, filed Dec. 29, 2021, which is incorporated herein by reference in its entirety.

BACKGROUND

Figure 1:
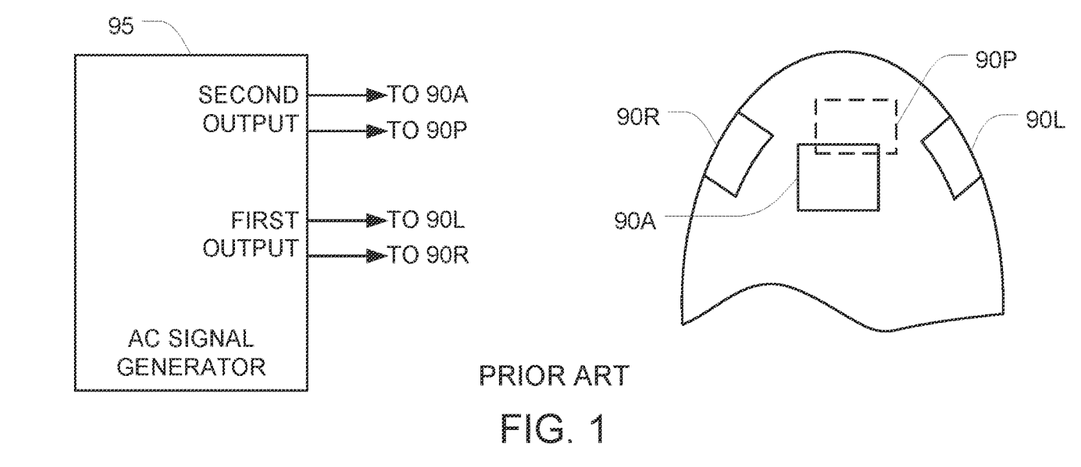
FIG. 1 is a schematic representation of the prior art Optune® system for delivering TTFields.

Tumor Treating Fields, or TTFields, are alternating electric fields within the intermediate frequency range (e.g., 100-500 kHz) that inhibit cancer cell growth. This non-invasive treatment targets solid tumors and is described in U.S. Pat. No. 7,565,205, which is incorporated herein by reference in its entirety. 200 kHz TTFields are FDA approved for the treatment of glioblastoma (GBM), and may be delivered, for example, via the prior art Optune® system, which is depicted schematically in FIG. 1. The TTFields are delivered to patients via four transducer arrays 90 (i.e., electrode arrays) that are placed on the patient's skin in close proximity to a tumor. Each transducer array 90 includes a plurality (e.g., between 9 and 20) capacitively coupled electrode elements, each of which has an electrically conductive substrate with a dielectric layer disposed thereon.

Alternating electric fields at frequencies between 50 kHz and 1 MHz can also be used to treat medical conditions other than tumors. For example, as described in U.S. Pat. No. 10,967,167 (which is incorporated herein by reference in its entirety), alternating electric fields e.g., at 50-200 kHz can increase the permeability of the blood brain barrier (BBB) so that, e.g., chemotherapy drugs can reach the brain. And as described in U.S. Pat. No. 11,103,698 (which is incorporated herein by reference in its entirety), alternating electric fields e.g., at 50-500 kHz can increase the permeability of cell membranes so that large molecules can traverse cell membranes.

Figure 2:
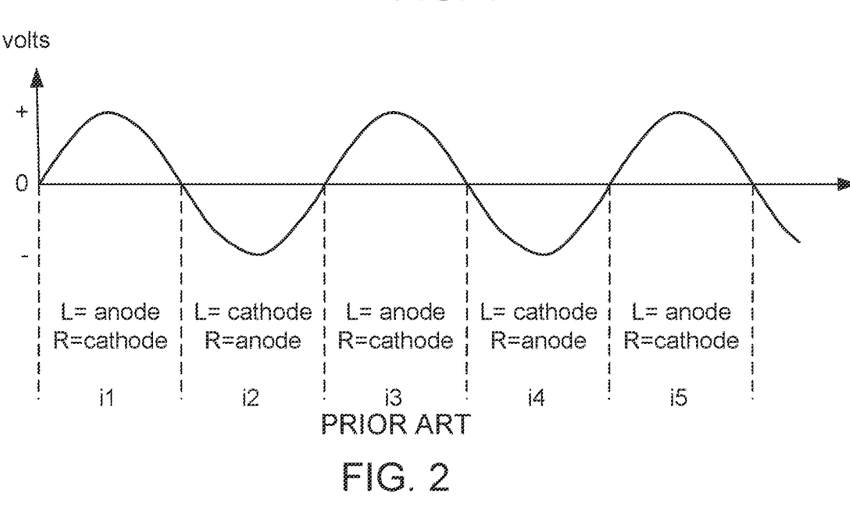
FIG. 2 depicts how each transducer array of the prior art Optune® system repeatedly switches back and forth between acting as the anode and acting as the cathode.

When Optune® is used to treat glioblastoma, one pair of arrays (90L, 90R) is positioned to the left and right of the tumor, and the other pair of arrays (90A, 90P) is positioned anterior and posterior to the tumor. The Optune® signal generator 95 (a) applies an AC voltage between arrays 90L, 90R for 1 second, which induces an electric field in one direction through the tumor; then (b) applies an AC voltage between the arrays 90A, 90P for 1 second, which induces an electric field in another direction through the tumor; then repeats that two-step sequence (a) and (b) for the duration of the treatment. During any given one of these 1 second intervals, each transducer array repeatedly switches back and forth between acting as the anode and acting as the cathode every cycle (due to the nature of AC signals). FIG. 2 depicts this phenomenon for the transducer arrays 90L, 90R. More specifically, during the odd intervals (e.g., i1, i3, etc.), the left transducer array 90L acts as the anode and the right transducer array 90R acts as the cathode. On the other hand, during the even intervals (e.g., i2, i4, etc.), the left transducer array 90L acts as the cathode and the right transducer array 90R acts as the anode. A similar situation exists for the other pair of arrays 90A, 90P.

SUMMARY OF THE INVENTION

One aspect of the invention is directed to a first method of treating a target region of a subject's body with an electric field. The first method comprises applying a plurality of electrical pulses between at least one first electrode element and at least one second electrode element. The at least one first electrode element and the at least one second electrode element are positioned on opposite sides of the target region. The at least one first electrode element has a first collective area, and the at least one second electrode element has a second collective area that is at least twice as large as the first collective area. The plurality of electrical pulses has a polarity such that the at least one first electrode element operates as an anode and the at least one second electrode element operates as a cathode. The first method also comprises applying an electrical signal between the at least one first electrode element and the at least one second electrode element. The electrical signal has a polarity such that the at least one first electrode element operates as a cathode and the at least one second electrode element operates as an anode. The electrical signal charge-balances the plurality of electrical pulses, and the electrical signal has an average amplitude. The plurality of electrical pulses has an average amplitude that is at least twice the average amplitude of the electrical signal.

In some instances of the first method, the plurality of electrical pulses has a pulse repetition rate between 50,000 and 1,000,000 pulses per second.

In some instances of the first method, the plurality of electrical pulses has a pulse repetition rate between 50,000 and 1,000,000 pulses per second, and the plurality of electrical pulses comprises at least 1000 groups of electrical pulses. Each group includes at least 1000 electrical pulses, with breaks having a duration of at least 10 ms disposed between adjacent groups. The electrical signal is applied during the breaks.

Optionally, in the instances described in the previous paragraph, the electrical signal may not be applied during intervals of time that lie between adjacent pulses within a given group of electrical pulses. Alternatively, the electrical signal may also be applied during intervals of time that lie between adjacent pulses within a given group of electrical pulses.

In some instances of the first method, the plurality of electrical pulses has a pulse repetition rate between 50,000 and 1,000,000 pulses per second, and the steps of (a) applying the plurality of electrical pulses and (b) applying the electrical signal are repeated in an alternating sequence at least 10,000 times.

Optionally, in the instances described in the previous paragraph, the plurality of electrical pulses has an average amplitude that is at least four times the average amplitude of the electrical signal, and the second collective area is at least four times as large as the first collective area.

In some instances of the first method, the plurality of electrical pulses has an average amplitude that is at least four times the average amplitude of the electrical signal, and the second collective area is at least four times as large as the first collective area. In some instances of the first method, the plurality of electrical pulses comprises a plurality of rectangular pulses. In some instances of the first method, the plurality of electrical pulses comprises a plurality of sinusoidally-shaped pulses.

In some instances of the first method, the step of applying the plurality of electrical pulses between the at least one first electrode element and the at least one second electrode element induces an electric field in the target region that provides an anti-tumor effect. In some instances of the first method, the step of applying the plurality of electrical pulses between the at least one first electrode element and the at least one second electrode element induces an electric field in the target region that increases the permeability of the subject's blood-brain-barrier.

In some instances of the first method, the at least one first electrode element comprises a first subset of a first array of electrode elements, and the at least one second electrode element comprises a second subset of a second array of electrode elements. The second subset contains at least twice as many electrode elements as the first subset.

Another aspect of the invention is directed to a first apparatus for treating a target region of a subject's body with an electric field. The first apparatus comprises a signal generator configured to output a plurality of electrical pulses between at least one first electrode element and at least one second electrode element. The plurality of electrical pulses has a polarity such that the at least one first electrode element operates as an anode and the at least one second electrode element operates as a cathode. The signal generator is further configured to output an electrical signal between the at least one first electrode element and the at least one second electrode element. The electrical signal has a polarity such that the at least one first electrode element operates as a cathode and the at least one second electrode element operates as an anode, and the electrical signal charge-balances the plurality of electrical pulses. The electrical signal has an average amplitude. The plurality of electrical pulses has an average amplitude that is at least twice the average amplitude of the electrical signal.

Some embodiments of the first apparatus further comprise the at least one first electrode element and the at least one second electrode element. In these embodiments, the at least one first electrode element and the at least one second electrode element are configured for positioning on or in the subject's body on opposite sides of the target region. The at least one first electrode element has a first collective area, and the at least one second electrode element has a second collective area that is at least twice as large as the first collective area.

Optionally, in the embodiments described in the previous paragraph, the plurality of electrical pulses may have an average amplitude that is at least four times the average amplitude of the electrical signal, and the second collective area is at least four times as large as the first collective area.

In some embodiments of the first apparatus, the plurality of electrical pulses has a pulse repetition rate between 50,000 and 1,000,000 pulses per second.

In some embodiments of the first apparatus, the plurality of electrical pulses has a pulse repetition rate between 50,000 and 1,000,000 pulses per second, and the plurality of electrical pulses comprises at least 1000 groups of electrical pulses, with each group including at least 1000 electrical pulses, with breaks having a duration of at least 10 ms disposed between adjacent groups. In these embodiments, the signal generator is configured to output the electrical signal during the breaks.

Optionally, in the embodiments described in the previous paragraph, the signal generator may be configured not to output the electrical signal during intervals of time that lie between adjacent pulses within a given group of electrical pulses. Alternatively, in the embodiments described in the previous paragraph, the signal generator may be configured to also output the electrical signal during intervals of time that lie between adjacent pulses within a given group of electrical pulses.

In some embodiments of the first apparatus, the plurality of electrical pulses comprises a plurality of rectangular pulses. In some embodiments of the first apparatus, the plurality of electrical pulses comprises a plurality of sinusoidally-shaped pulses.

In some embodiments of the first apparatus, the at least one first electrode element comprises a first subset of a first array of electrode elements, the at least one second electrode element comprises a second subset of a second array of electrode elements, and the second subset contains at least twice as many electrode elements as the first subset.

Another aspect of the invention is directed to a second method of treating a target region of a subject's body with an electric field. The second method comprises applying a plurality of electrical pulses between at least one first electrode element and at least one second electrode element. The at least one first electrode element has a first collective area, and the at least one second electrode element has a second collective area that is larger than the first collective area. Let R stand for the ratio of the area of the at least one second electrode to the area of the at least one first electrode. The plurality of electrical pulses has a polarity such that the at least one first electrode element operates as an anode and the at least one second electrode element operates as a cathode. The anode and the cathode are active for a given total period of time, within which the anode may pulse on and off at one frequency and the cathode may pulse on and off at a second frequency. Within the total period, the anode operates for one total sub-period, and the cathode operates for a second total sub-period. The amplitude at the anode is larger than the amplitude at the cathode. The second method also comprises applying an electrical signal between the anode and the cathode, effecting a condition over the total period wherein the integral of the amplitude over time of the anode divided by the integral of the amplitude over time of the cathode equals the ratio R. And thus, in compensation for the larger area of the cathode than the anode, the total electric charge delivered to tissue over the total period of time from the anode is equal in magnitude and opposite in charge to the total electric charge delivered to tissue from the cathode and sum to zero.

BRIEF DESCRIPTION OF THE DRAWINGS

Various embodiments are described in detail below with reference to the accompanying drawings, wherein like reference numerals represent like elements.

DESCRIPTION OF THE PREFERRED EMBODIMENTS

When treating a subject using alternating electric fields, higher amplitudes are strongly associated with higher efficacy of treatment. However, as the amplitude of the alternating electric field increases, and/or as the frequency of the alternating electric field decreases (e.g., to the vicinity of 100 kHz), some subjects experience an electrosensation effect when the alternating electric field switches direction. This electrosensation could be, for example, a vibratory sensation, paresthesia, and/or a twitching or contraction sensation of muscle fibers. The electrosensation is believed to originate from interactions between the alternating electric fields and nerve cells (i.e., neurons) that are positioned near or adjacent to the transducer arrays. And these sensations may discourage some subjects from continuing their treatment using alternating electric fields.

This application describes a variety of approaches for reducing or eliminating electrosensation while a subject is being treated with alternating electric fields.

Assume that a pure AC current (i.e., a current with no DC component) at a given frequency is being coupled through an electrode into a subject's body through a pair of identical electrodes that are positioned on the subject's skin. When the current density (i.e., the current through any given electrode divided by the area of that electrode) is below a threshold value (which may vary from person to person), electrosensation does not occur. But when the current density rises above that threshold, electrosensation starts to occur, and will become more noticeable when the current density is increased further.

As explained above in connection with FIG. 2, each electrode within any given pair repeatedly switches back and forth between acting as the anode and acting as the cathode every cycle (due to the nature of AC signals). The inventors have determined that when both electrodes are identical, the phenomenon that gives rise to electrosensation is more pronounced at the electrode that is acting as the cathode (at any given instant) than it is at the electrode that is acting as the anode (at that same instant). Thus, during the odd intervals (e.g., i1, i3, etc. in FIG. 2) when the right electrode 90R is acting as the cathode, the electrosensation is more pronounced at the right electrode. On the other hand, during the even intervals (e.g., i2, i4, etc. in FIG. 2), when the left electrode 90L acts as the cathode, the electrosensation is more pronounced at the left electrode.

Currently available data suggests that the threshold current density that gives rise to electrosensation at anodes is significantly higher than the threshold current density that gives rise to electrosensation at cathodes. The embodiments described herein advantageously rely on this disparity to avoid or reduce electrosensation. This is accomplished by configuring the electrodes and the signals that are applied to those electrodes so that the current density at the cathode is less than (e.g., less than half, less than 1/3, or less than 1/4) the current density at the anode.

Figure 3:
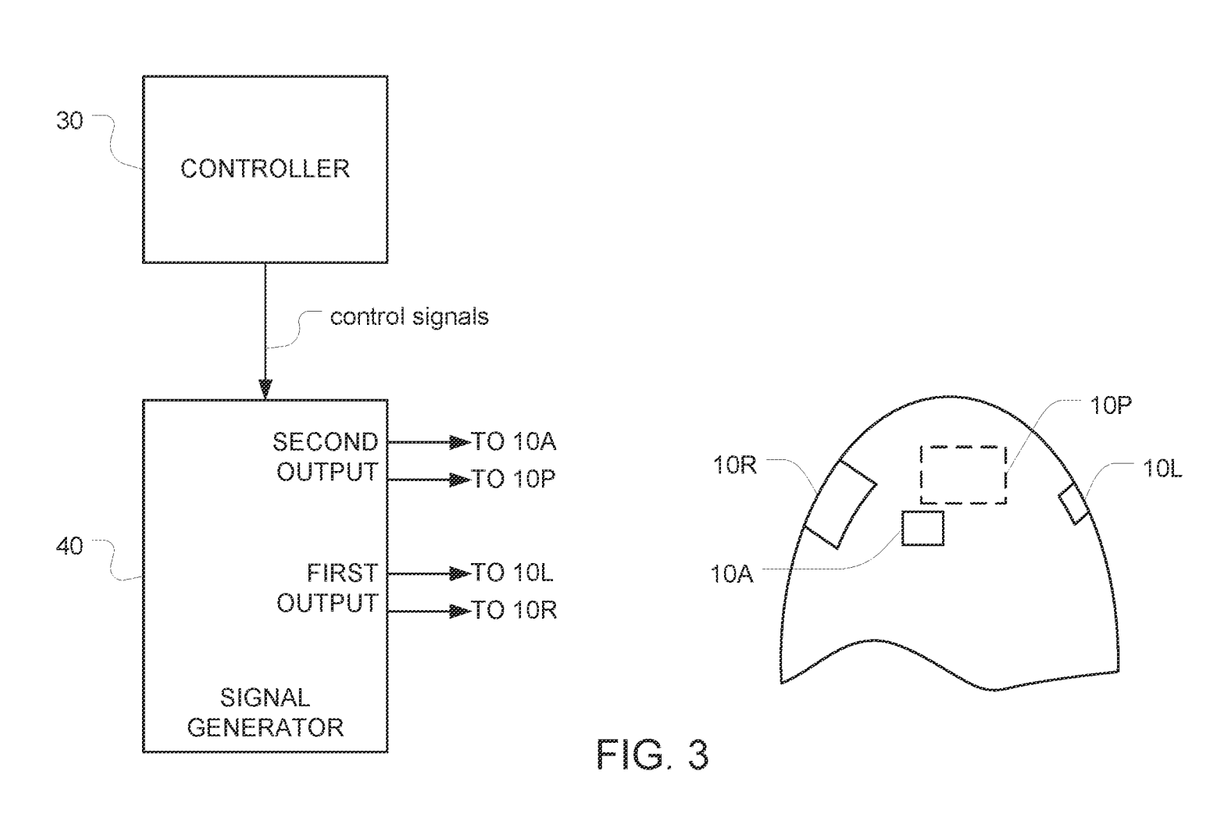
FIG. 3 depicts an apparatus for avoiding or reducing electrosensation while treating a target region of a subject's body with an alternating electric field.

FIG. 3 depicts an apparatus for avoiding or reducing electrosensation while treating a target region of a subject's body with an alternating electric field. The FIG. 3 embodiment includes a signal generator 40 that generates a first output which is applied to the electrodes 10L and 10R, and a second output which is applied to electrodes 10A and 10P. The operation of the signal generator 40 is controlled by a controller 30.

Figure 4A:
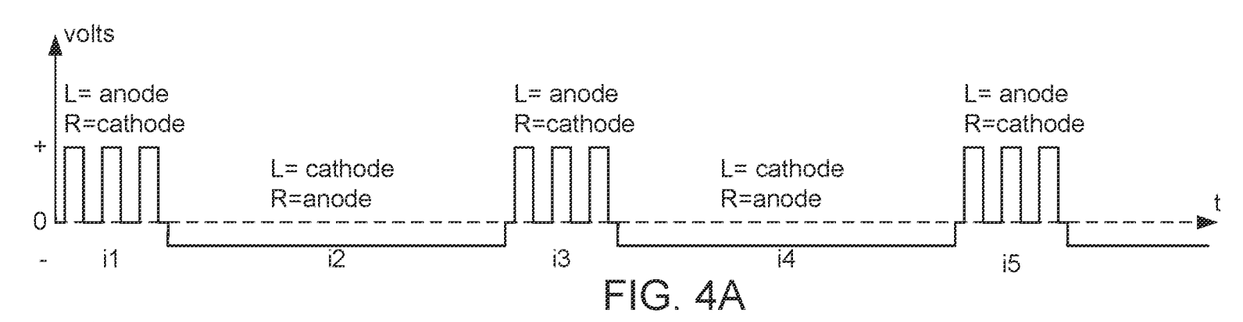
FIGS. 4A-4C depict three examples of suitable waveforms that the signal generator may apply between the electrodes.
Figure 4B:
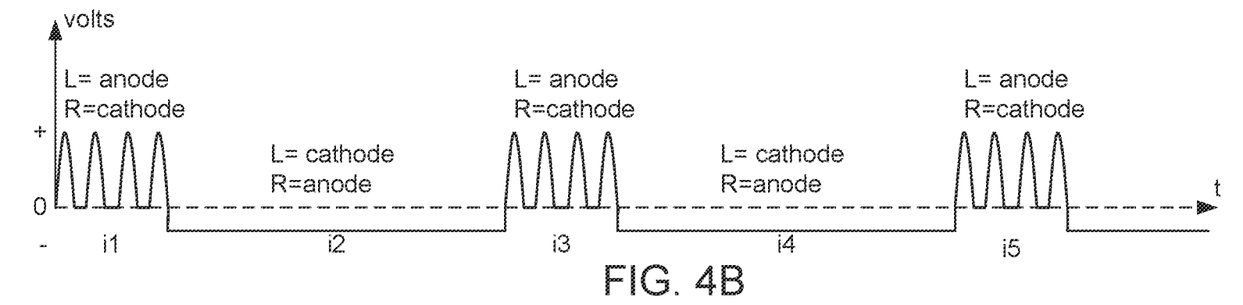
Figure 4C:
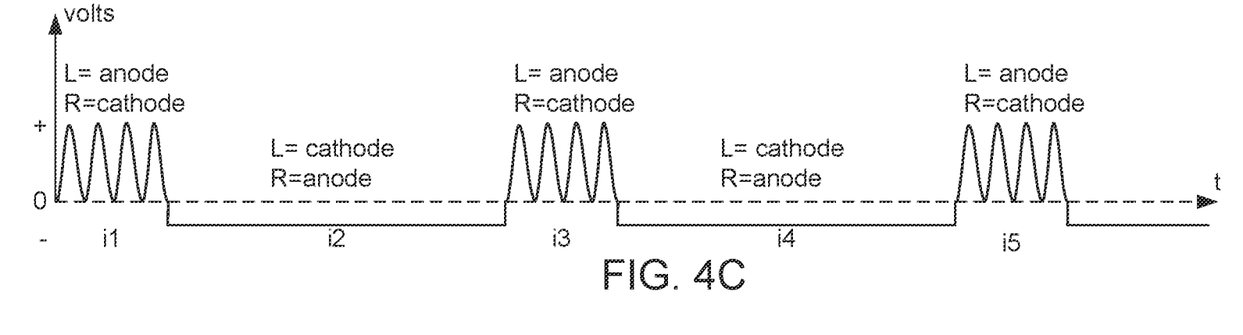

FIGS. 4A-4C depict three examples of suitable waveforms for the signal generator 40 in FIG. 3 to apply between the electrodes 10L and 10R. In the FIG. 4A example, the signal generator 40 applies rectangular pulses to the electrodes 10L and 10R during the odd intervals of time (i1, i3, etc.) and applies a charge balancing signal during the even intervals of time (i2, i4, etc.). The FIGS. 4B and 4C examples are similar to the FIG. 4A example, except that the shape of the pulses is a rectified sinusoid in FIG. 4B, and an offset sinusoid in FIG. 4C.

The pulse rate of the signals generated by the signal generator 40 will depend on the type of treatment. For example, to treat a tumor using TTFields, the signal generator 40 might deliver pulses at a rate of, e.g., 150-200 thousand pulses per second. Or to increase the permeability of a subject's blood-brain barrier, the signal generator 40 might deliver pulses at a rate of, e.g., 50-200 thousand pulses per second (e.g., 100,000 pulses per second).

In the FIGS. 3-4 example, alternating electric fields are used to treat a target region in a subject's head. A first electrode 10L is positioned on the left side of the subject's head (i.e., on one side of the target region), and a second electrode 10R is positioned on the right side of the subject's head (i.e., on the opposite side of the target region). The signal generator 40 applies a plurality of electrical pulses between the first electrode 10L and the second electrode 10R (via the first output) during the odd intervals of time (i1, i3, etc. in FIGS. 4A-4C). This induces an alternating electric field through the target region with electric field lines that generally run left to right, which provides the intended therapeutic effect (e.g., treating a tumor). The frequency of the alternating electric field will match the frequency of the pulses.

The polarity of the electrical pulses is such that the first electrode 10L operates as the anode and the second electrode element 10R operates as the cathode. And notably, the area of the second electrode 10R is larger, for example at least twice, at least three times, or at least four times as large as the area of the first electrode 10L. This is important because, as explained above, if both electrodes were identical, the electrosensation would be more pronounced at the cathode that at the anode. But when the surface area of the second electrode 10R is larger than the surface area of the first electrode 10L, it causes the current density at the cathode 10R to go down, which ameliorates the electrosensation at the cathode.

The burst of pulses depicted in interval i1 of FIG. 4A-4C should not be maintained for extended periods of time because they contain a significant DC component that will typically cause tissue damage. So to prevent this from occurring, the pulses are applied in bursts (i.e., only during the odd intervals of time i1, i3, etc. in FIGS. 4A-4C). And between those burst of pulses (i.e., during the even intervals of time i2, i4, etc. in FIGS. 4A-4C) an electrical signal is applied between the first electrode 10L and the second electrode 10R to charge-balance the plurality of electrical pulses that are generated during the odd intervals of time.

This electrical signal has a polarity such that the first electrode 10L operates as the cathode and the second electrode 10R operates as the anode. The duration and magnitude of the electrical signal during the even intervals of time are set to charge-balance the plurality of electrical pulses that are generated during the odd intervals of time. Assume for example, that rectangular pulses with an amplitude of X and a 50% duty cycle are applied for 1 second during each of the odd intervals of time. Those pulses could be charge balanced, e.g., by applying a DC signal with an amplitude of X/2 for one second during each of the even intervals of time, or by applying a DC signal with an amplitude X/4 for two seconds during each of the even intervals of time, etc.

The plurality of electrical pulses has an average amplitude that is at least twice the average amplitude of the electrical signal. But notably, because the larger electrode 10R is operating as the cathode during the electrical pulses (i.e., during the odd intervals), the current density at the cathode will be smaller than the current density at the anode during the electrical pulses. This compensates for the increased sensitivity to electrosensation at the cathode. On the other hand, during the even intervals when the smaller electrode 10L is acting as the cathode, electrosensation will not be a problem because the amplitude is smaller. And preferably, the amplitude during these even intervals is small enough to avoid electrosensation. To accomplish this, the durations of the even intervals will typically be longer than the durations of the odd intervals. Although in some embodiments, (e.g., when a small duty cycle is used during the odd intervals), the durations of the even intervals could be the same or even shorter than the durations of the odd intervals.

Note that in the example depicted in FIG. 3 and described above, the electrode 10R is larger than (e.g., twice as large as) the electrode 10L, and the electrode 10R operates as the cathode during the odd intervals of time (i.e., i1, i3, etc.). But alternatively, the size and polarity relationships of the two electrodes 10L, 10R could also both be reversed. More specifically, the electrode 10L could be made larger than (e.g., twice as large as) the electrode 10R, in which case the electrode 10L should operate as the cathode during the odd intervals of time. The important thing is that in all cases, the larger electrode should operate as the cathode during the intervals of time when the relatively high amplitude pulses are being applied.

In some embodiments, including the embodiment depicted in FIG. 3, a second pair of electrodes 10A and 10P are used to apply an electric field in an additional direction through the tumor. One of these electrodes 10A is positioned on the anterior side of the subject's head (i.e., on one side of the target region), and the other electrode 10P is positioned on the posterior side of the subject's head (i.e., on the opposite side of the target region). In these embodiments, the signal generator 40 alternates between applying pulses and signals to the first pair of electrodes 10L, 10R and applying pulses and signals to the second pair of electrodes 10A, 10P. For example, the signal generator 40 could (a) apply pulses and signals to the first pair of electrodes 10L, 10R for one second (which induces an electric field with electric field lines that generally run left to right through the tumor), then (b) apply pulses and signals to the second pair of electrodes 10A, 10P for one second (which induces an electric field with electric field lines that generally run front to back through the tumor), then repeats that two-step sequence (a) and (b) for the duration of the treatment. The orientation of the electric field will therefore repeatedly alternate back and forth between two directions.

The area of the electrode 10P is at least twice as large as the area of the electrode 10A, and the polarity of the electrical pulses is such that the first electrode 10A operates as the anode and the second electrode element 10P operates as the cathode. This is similar to the situation described above where the larger electrode 10R operates as a cathode during the electrical pulses. The characteristics of the waveforms that are applied to the second pair of electrodes 10A and 10P (including the plurality of pulses and the electrical signals) are similar to the characteristics of the waveforms that are applied to electrodes 10L and 10R, depicted in FIGS. 4A-4C and described above, and achieve similar results.

Here again, the size and polarity relationships of the two electrodes 10A, 10P could also both be reversed. More specifically, the electrode 10A could be made larger than (e.g., twice as large as) the electrode 10P, in which case the electrode 10A should operate as the cathode during the odd intervals of time (i.e., i1, i3, etc.). The important thing is that in all cases, the larger electrode should operate as the cathode during the intervals of time when the relatively high amplitude pulses are being applied.

In other anatomic locations (e.g., in the spine), an electric field with a constant orientation may be used. In these situations, only one pair of electrodes is necessary, and the second pair of electrodes may be omitted (along with those portions of the signal generator 40 that drive the second pair of electrodes).

In some embodiments, the electrodes 10L, 10R, 10A, and 10P are capacitively-coupled electrodes (i.e., a conductive plate covered by a layer of a dielectric material on the side that faces the subject's body). But in alternative embodiments, they can be conductive electrodes (e.g., a flat slab of metal).

Figure 5:
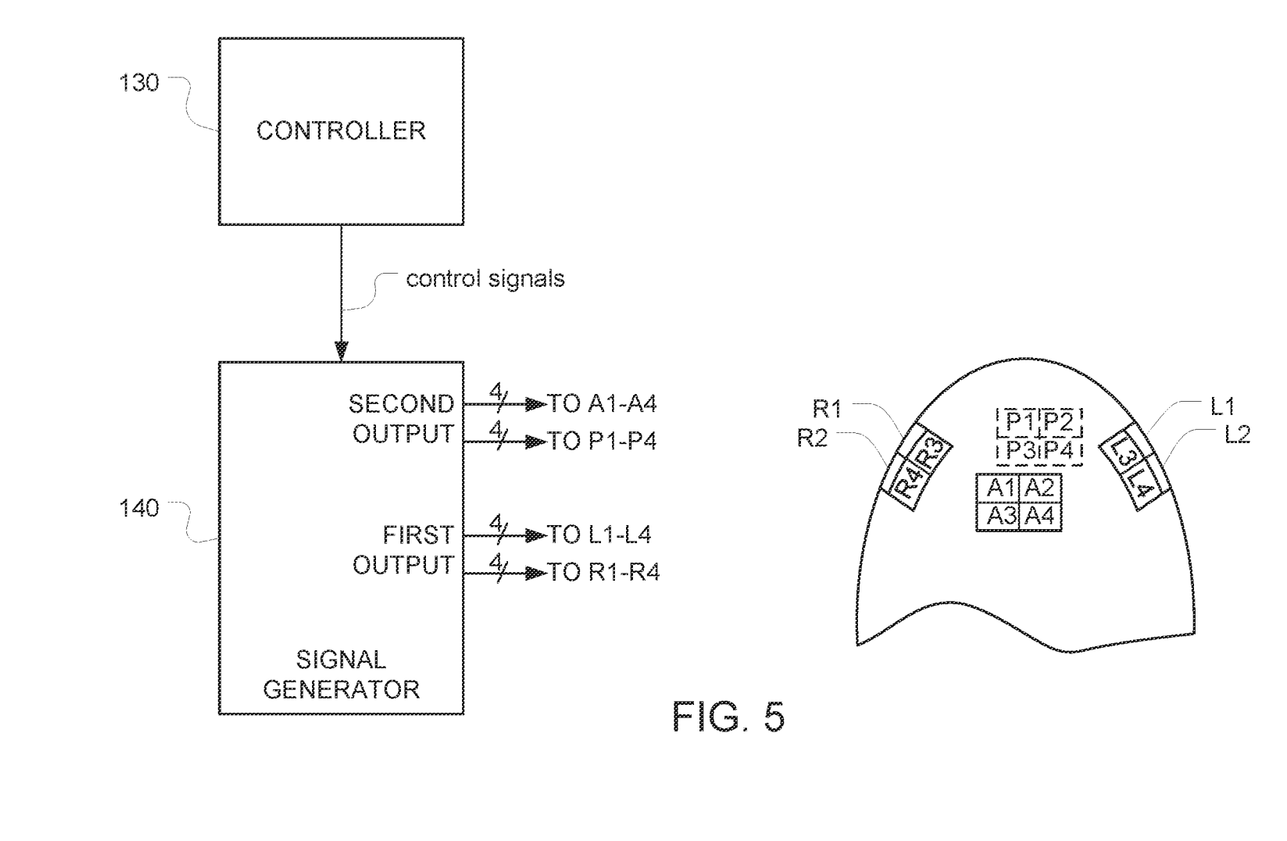
FIG. 5 depicts another apparatus for avoiding or reducing electrosensation while treating a target region of a subject's body with an alternating electric field.

FIG. 5 depicts another apparatus for avoiding or reducing electrosensation while treating a target region of a subject's body with an alternating electric field. The FIG. 5 embodiment includes a signal generator 140 that generates an individual first output to each individual electrode element within the electrode arrays L1-L4 and R1-R4, and generates an individual second output to each individual electrode element within the electrode arrays A1-A4 and P1-P4. The operation of the signal generator 140 is controlled by a controller 130. Note that while FIG. 5 shows that each of the left, right, anterior, and posterior electrode arrays have four electrode elements, the number of electrode elements within any given array can vary. For example, in some embodiments, each of the left, right, anterior, and posterior electrode arrays have between 9 and 40 electrode elements.

Unlike the FIG. 3 embodiment described above, where the effective area of each of the four electrodes 10L, 10R, 10A, and 10P remains constant at all times, the effective areas of the left, right, anterior, and posterior arrays can be adjusted by the controller by controlling the signals that are generated by the signal generator 140. The following two examples will illustrate how the effective area of a given array can be adjusted. In the first example, the signal generator 140 applies a sinusoid voltage with no DC component between all the elements L1-L4 in the left array and all of the elements R1-R4 in the right array. In this situation, the collective area that is actually being used in the left array will be the sum of all the areas of the individual elements L1-L4 in that array, and the collective area that is actually being used in the right array will be the sum of all the areas of the individual elements R1-R4 in that array.

In the second example, elements L2-L4 are not activated, and the signal generator 140 applies a sinusoidal voltage with no DC components between only element L1 in the left array and all of the elements R1-R4 in the right array. In this situation, the collective area that is actually being used in the left array will be the area of the single electrode element L1, while the collective area that is actually being used in the right array will be the sum of all the areas of the individual elements R1-R4 in that array. Accordingly, this situation replicates the situation described above in connection with FIG. 3 (in which the effective area of the one electrode is permanently smaller than the effective area of the opposite electrode).

The controller 130 can therefore increase the collective area that is used to apply signals/pulses to the left side of the subject's head by increasing the number of electrode elements L1-L4 to which the signals/pulses are applied at any given moment, or decrease the collective area that is used to apply signals/pulses to the left side of the subject's head by decreasing the number of electrode elements L1-L4 to which the signals/pulses are applied at any given moment. Similarly, the controller 130 can increase the collective area that is used to apply signals/pulses to the right side of the subject's head by increasing the number of electrode elements R1-R4 to which the signals/pulses are applied at any given moment, or decrease the collective area that is used to apply signals/pulses to the right side of the subject's head by decreasing the number of electrode elements R1-R4 to which the signals/pulses are applied at any given moment.

Stated in other terms, the signals/pulses are applied between a subset of the set of first electrode elements L1-L4 and a subset of the set of second electrode elements R1-R4. These subsets may be proper subsets (i.e., subsets that contain fewer than all the electrode elements of the respective array), or they may include all the electrode elements of the respective array.

The same waveforms described above in connection with FIG. 4A-4C may be used in this FIG. 5 embodiment. In this embodiment, the signal generator 140 applies pulses to the left and right electrode arrays during the odd intervals of time (i1, i3, etc.) and applies a charge balancing signal during the even intervals of time (i2, i4, etc.).

In the FIG. 5 example, alternating electric fields are used to treat a target region in a subject's head. A set of first electrode elements L1-L4 is positioned on the left side of the subject's head (i.e., on one side of the target region), and a set of second electrode elements R1-R4 is positioned on the right side of the subject's head (i.e., on the opposite side of the target region). The signal generator 140 applies a plurality of electrical pulses between at least one of the first electrode elements L1-L4 and at least one of the second electrode elements R1-R4 during the odd intervals of time (i1, i3, etc. in FIGS. 4A-4C). This induces an alternating electric field through the target region with electric field lines that generally run left to right, which provides the intended therapeutic effect (e.g., treating a tumor). The frequency of the alternating electric field will match the frequency of the pulses.

The polarity of the electrical pulses is such that the set of first electrode elements L1-L4 operates as the anode and the set of second electrode elements R1-R4 operates as the cathode during the odd intervals of time (i.e., i1, i3, etc.). And notably, the collective area of the set of second electrode elements R1-R4 that receives the pulses during the odd intervals of time is at least twice as large as the collective area of the set of first electrode elements L1-L4 that receives the pulses during those intervals. This is important because, as explained above, if the effective areas of both sets of electrode elements were identical, the electrosensation would be more pronounced at the cathode that at the anode. But when the effective area of the set of second electrode elements R1-R4 is larger than the effective area of the set of first electrode elements L1-L4, it causes the current density at the set of second electrode elements R1-R4 to go down, which ameliorates the electrosensation at the cathode.

Charge balancing in this FIG. 5 embodiment is similar to the charge balancing discussed above in connection with FIGS. 3-4. More specifically, the pulses are applied in bursts (i.e., only during the odd intervals of time i1, i3, etc. in FIGS. 4A-4C). And between those burst of pulses (i.e., during the even intervals of time i2, i4, etc. in FIGS. 4A-4C) an electrical signal is applied between the set of first electrode elements L1-L4 and the set of second electrode elements R1-R4 (or, more specifically, the same electrode elements in each of those sets that were used to deliver the pulses) to charge-balance the plurality of electrical pulses that are generated during the odd intervals of time.

This electrical signal that implements charge balancing has a polarity such that the set of first electrode elements L1-L4 operates as the cathode and the set of second electrode elements R1-R4 operates as the anode. The characteristics of the electrical signals that are used to implement charge balancing in this FIG. 5 embodiment are similar to those described above in connection with the FIGS. 3-4 embodiment.

The plurality of electrical pulses has an average amplitude that is at least twice the average amplitude of the electrical signal. As in the FIGS. 3-4 embodiment, because a larger collective area is actively operating as the cathode during the electrical pulses (i.e., during the odd intervals), the current density at the cathode will be smaller than the current density at the anode during the electrical pulses. This compensates for the increased sensitivity to electrosensation at the cathode. On the other hand, during the even intervals when the smaller collective area is acting as the cathode, electrosensation will not be a problem because the amplitude is smaller.

Note that in the example depicted in FIG. 5 and described above, the collective area of the set of second electrode elements R1-R4 that receives the pulses is larger than (e.g., twice as large as) the collective area of the set of first electrode elements L1-L4 that receives the pulses, and the set of second electrode elements R1-R4 operates as the cathode during the odd intervals of time (i.e., i1, i3, etc.). But alternatively, the size and polarity relationships of the two sets of electrode elements L1-L4, R1-R4 could also both be reversed. More specifically, the collective area of the set of electrode elements L1-L4 that receives the pulses could be made larger than (e.g., twice as large as) the collective area of the set of electrode elements R1-R4 that receives the pulses, in which case the set of electrode elements L1-L4 should operate as the cathode during the odd intervals of time. The important thing is that in all cases, the set of electrode elements with the larger effective area that receives the pulses should operate as the cathode during the intervals of time when the relatively high amplitude pulses are being applied.

In some embodiments, including the embodiment depicted in FIG. 5, a second pair of sets of electrode elements A1-A4 and P1-P4 are used to apply an electric field in an additional direction through the tumor. These sets are positioned on the anterior and posterior sides of the subject's head, respectively. Alternation between the left/right sets of electrode elements L1-L4/R1-R4 and the anterior/posterior sets of electrode elements A1-A4/P1-P4 is similar to the alternation between the left/right and anterior/posterior electrodes described above in connection with FIGS. 3-4.

The effective area of the posterior set of electrode elements is at least twice as large as the effective area of the anterior set of electrode elements, and the polarity of the electrical pulses is such that the anterior set of electrode elements operates as the anode and the posterior set of electrode elements operates as the cathode. This is similar to the situation described above where the larger effective area of the right set of electrode elements operates as a cathode during the electrical pulses. The characteristics of the waveforms that are applied to the anterior/posterior sets of electrode elements are similar to the characteristics of the waveforms that are applied to left/right sets of electrode elements described above, and achieve similar results.

Figure 6A:
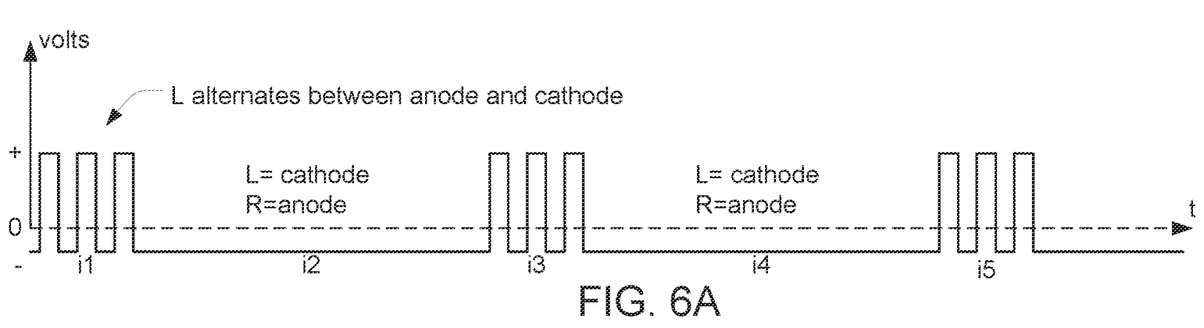
FIGS. 6A-6C depict three more examples of suitable waveforms that the signal generator may apply between the electrodes.
Figure 6B:
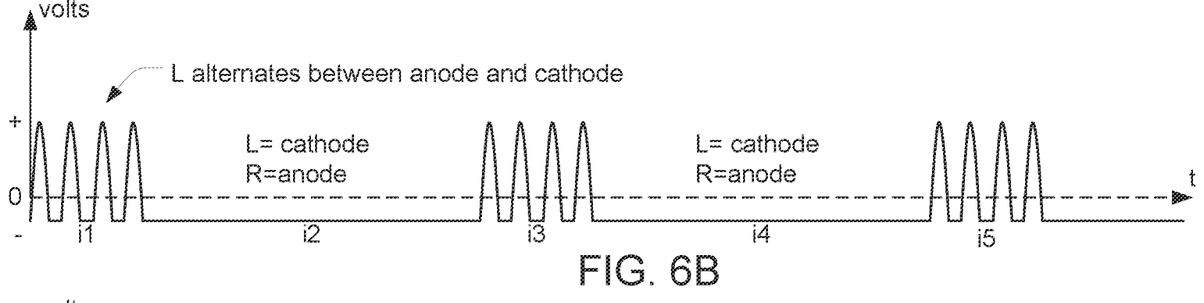
Figure 6C:
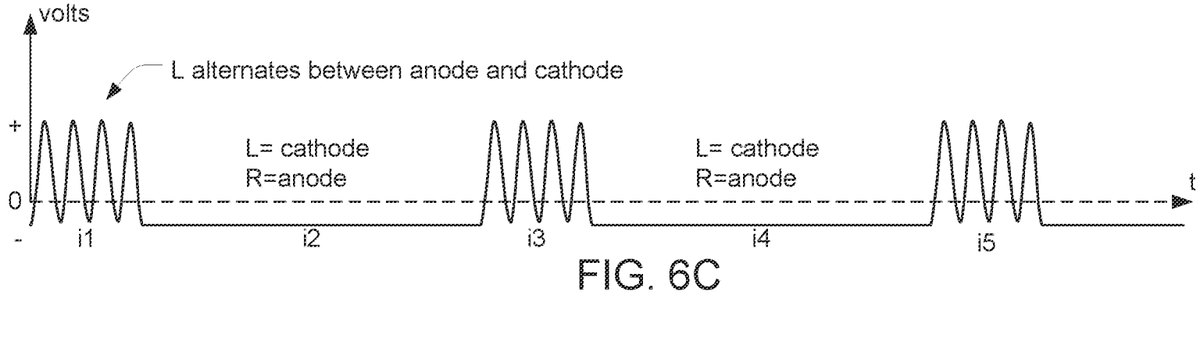

FIGS. 6A-6C depict three more examples of suitable waveforms for the signal generator 40 in FIG. 3 to apply between the electrodes 10L and 10R. In the FIG. 6A example, the signal generator 40 applies rectangular pulses during the odd intervals of time (i1, i3, etc.) and applies a charge balancing signal during the even intervals of time (i2, i4, etc.). And in addition, the signal generator 40 applies an additional charge balancing signal during those intervals of time that lie between the pulses during the odd intervals of time (i1, i3, etc.). The FIGS. 6B and 6C examples are similar to the FIG. 6A example, except that the shape of the pulses is a rectified sinusoid in FIG. 6B, and an offset sinusoid in FIG. 6C.

As with the waveforms depicted in FIGS. 4A-4C, the polarity of the electrical pulses is such that the first electrode 10L operates as the anode and the second electrode element 10R operates as the cathode for the duration of each individual pulse within a given burst of pulses (i.e., the positive portion of each pulse depicted in FIGS. 6A-6C).

During the even intervals of time (i2, i4, etc.), the electrical signal has a polarity such that the first electrode 10L operates as the cathode and the second electrode 10R operates as the anode. This provides most of the charge balancing. But notably, additional charge balancing is also provided during those portions of the odd intervals of time (i1, i3, etc.) where the voltage is negative. This is because during those negative excursions, the electrical signal briefly has a polarity such that the first electrode 10L operates as the cathode and the second electrode 10R operates as the anode.

The FIGS. 6A-6C waveforms may also be applied by the signal generator 140 between the set of first electrode elements L1-L4 and the set of second electrode elements R1-R4 in the FIG. 5 embodiment. In this case, the signal generator 140 applies pulses during the odd intervals of time (i1, i3, etc.) and applies a charge balancing signal during the even intervals of time (i2, i4, etc.). And in addition, the signal generator 140 applies an additional charge balancing signal during those intervals of time that lie between the pulses during the odd intervals of time (i1, i3, etc.).

The polarity of the electrical pulses is such that the set of first electrode elements L1-L4 operates as the anode and the set of second electrode elements R1-R4 operates as the cathode for the duration of each individual pulse within a given burst of pulses (i.e., the positive portion of each pulse depicted in FIGS. 6A-6C).

During the even intervals of time (i2, i4, etc.), the electrical signal has a polarity such that the set of first electrode elements L1-L4 operates as the cathode and the set of second electrode elements R1-R4 operates as the anode. This provides most of the charge balancing. But notably, additional charge balancing is also provided during those portions of the odd intervals of time (i1, i3, etc.) where the voltage is negative. This is because during those negative excursions, the electrical signal briefly has a polarity such that the set of first electrode elements L1-L4 operates as the cathode and the set of second electrode elements R1-R4 operates as the anode.

When additional charge balancing occurs during the odd intervals of time as depicted in FIGS. 6A-6C (when combined with either the FIG. 3 embodiment or the FIG. 5 embodiment), the amount of charge balancing that must be performed during the even intervals of time can be reduced. And this can advantageously reduce the length of the even intervals of time, which means that more time can be spent applying pulses in order to obtain the desired therapeutic effect.

Another approach for reducing or eliminating electrosensation while a subject is being treated with alternating electric fields includes applying a plurality of electrical pulses between at least one first electrode element and at least one second electrode element. The at least one first electrode element has a first collective area, and the at least one second electrode element has a second collective area that is larger than the first collective area. Let R stand for the ratio of the area of the at least one second electrode to the area of the at least one first electrode. The plurality of electrical pulses has a polarity such that the at least one first electrode element operates as an anode and the at least one second electrode element operates as a cathode. The anode and the cathode are active for a given total period of time, within which the anode may pulse on and off at one frequency and the cathode may pulse on and off at a second frequency. Within the total period, the anode operates for one total sub-period, and the cathode operates for a second total sub-period. The amplitude at the anode is larger than the amplitude at the cathode.

This approach also includes applying an electrical signal between the anode and the cathode, effecting a condition over the total period wherein the integral of the amplitude over time of the anode divided by the integral of the amplitude over time of the cathode equals the ratio R. And thus, in compensation for the larger area of the cathode than the anode, the total electric charge delivered to tissue over the total period of time from the anode is equal in magnitude and opposite in charge to the total electric charge delivered to tissue from the cathode and sum to zero. This provides a way to meet two seemingly conflicting conditions: first, the amplitude of the anodic signal is greater than amplitude of the cathodic signal, and second, the signals are charge-balanced over the total period of time.

Optionally, in any of the embodiments described herein, the plurality of electrical pulses has a pulse repetition rate between 50,000 and 1,000,000 pulses per second. The optimal value of the pulse repetition rate will depend on the reason why the electric fields are being applied to the subject's body.

For example, if the electric fields are being applied to the subject's body to treat a tumor, the pulse repetition rate could be, for example, 50,000-500,000 pulses per second (pps), 50,000-300,000 pps, or 100,000-300,000 pps. For specific types of tumors, the optimal pulse repetition rate may have a corresponding specific range. For example, if the electric fields are being used to treat glioblastoma, the pulse repetition rate could be, for example, 175,000-225,000 pps or 200,000 pps. Or if the electric fields are being used to treat mesothelioma, the pulse repetition rate could be, for example, 125,000-175,000 pps or 150,000 pps.

Alternatively, if the electric fields are being applied to increase the permeability of cell membranes, the pulse repetition rate could be, for example, 50,000-500,000 pps, 50,000-200,000 pps, 50,000-150,000 pps, 75,000-125,000 pps, or 100,000 pps. Alternatively, if the electric fields are being applied to increase the permeability of the blood brain barrier, the pulse repetition rate could be, for example, 50,000-500,000 pps, 250,000-350,000 pps, 75,000-175,000 pps, or 125,000-175,000 pps.

Optionally, in any of the embodiments described herein, the plurality of electrical pulses has a pulse repetition rate between 50,000 and 1,000,000 pulses per second, and the plurality of electrical pulses comprises at least 1000 groups of electrical pulses, with each group including at least 1000 electrical pulses, with breaks having a duration of at least 10 ms disposed between adjacent groups. The electrical signal is applied during the breaks.

Optionally, in the FIG. 3 embodiment, the plurality of electrical pulses has a pulse repetition rate between 50,000 and 1,000,000 pulses per second, and the plurality of electrical pulses comprises at least 1000 groups of electrical pulses, with each group including at least 1000 electrical pulses, with breaks having a duration of at least 10 ms disposed between adjacent groups. The electrical signal is applied during the breaks and is not applied during intervals of time that lie between adjacent pulses within a given group of electrical pulses.

Optionally, in the FIG. 5 embodiment, the plurality of electrical pulses has a pulse repetition rate between 50,000 and 1,000,000 pulses per second, and the plurality of electrical pulses comprises at least 1000 groups of electrical pulses, with each group including at least 1000 electrical pulses, with breaks having a duration of at least 10 ms disposed between adjacent groups. The electrical signal is applied during the breaks and is also applied during intervals of time that lie between adjacent pulses within a given group of electrical pulses.

Optionally, in any of the embodiments described herein, the plurality of electrical pulses has a pulse repetition rate between 50,000 and 1,000,000 pulses per second, and the steps of (a) applying the plurality of electrical pulses and (b) applying the electrical signal are repeated in an alternating sequence at least 10,000 times. And the plurality of electrical pulses has an average amplitude that is at least four times the average amplitude of the electrical signal, and the second collective area is at least four times as large as the first collective area.

Optionally, in any of the embodiments described herein, the plurality of electrical pulses has an average amplitude that is at least four times the average amplitude of the electrical signal. And the second collective area is at least four times as large as the first collective area.

Optionally, in any of the embodiments described herein, the plurality of electrical pulses comprises a plurality of rectangular pulses. Optionally, in any of the embodiments described herein, the plurality of electrical pulses comprises a plurality of sinusoidally-shaped pulses.

Optionally, in any of the embodiments described herein, the step of applying the plurality of electrical pulses between the at least one first electrode element and the at least one second electrode element induces an electric field in the target region that provides an anti-tumor effect. Optionally, in any of the embodiments described herein, the step of applying the plurality of electrical pulses between the at least one first electrode element and the at least one second electrode element induces an electric field in the target region that increases the permeability of the subject's blood-brain-barrier.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of treating a target region of a subject's body with an electric field, the method comprising:

applying a plurality of electrical pulses between at least one first electrode element and at least one second electrode element, wherein the at least one first electrode element and the at least one second electrode element are positioned on opposite sides of the target region, wherein the at least one first electrode element has a first collective area, wherein the at least one second electrode element has a second collective area that is at least twice as large as the first collective area, and wherein the plurality of electrical pulses has a polarity such that the at least one first electrode element operates as an anode and the at least one second electrode element operates as a cathode; and applying an electrical signal between the at least one first electrode element and the at least one second electrode element, wherein the electrical signal has a polarity such that the at least one first electrode element operates as a cathode and the at least one second electrode element operates as an anode, wherein the electrical signal charge-balances the plurality of electrical pulses, and wherein the electrical signal has an average amplitude, wherein the plurality of electrical pulses has an average amplitude that is at least twice the average amplitude of the electrical signal, wherein the plurality of electrical pulses has a pulse repetition rate between 50,000 and 1,000,000 pulses per second, and wherein the plurality of electrical pulses has a waveform that collectively resembles (i) a sequence of rectangular pulses with a 50% duty cycle, (ii) a rectified sinusoid, or (iii) an offset sinusoid.

2. The method of claim 1, wherein the plurality of electrical pulses comprises at least 1000 groups of electrical pulses, with each group including at least 1000 electrical pulses, with breaks having a duration of at least 10 ms disposed between adjacent groups, and wherein the electrical signal is applied during the breaks.

3. The method of claim 2, wherein the electrical signal is not applied during intervals of time that lie between adjacent pulses within a given group of electrical pulses.

4. The method of claim 2, wherein the electrical signal is also applied during intervals of time that lie between adjacent pulses within a given group of electrical pulses.

5. The method of claim 1, wherein the steps of (a) applying the plurality of electrical pulses and (b) applying the electrical signal are repeated in an alternating sequence at least 10,000 times.

6. The method of claim 5, wherein the plurality of electrical pulses has an average amplitude that is at least four times the average amplitude of the electrical signal, and wherein the second collective area is at least four times as large as the first collective area.

7. The method of claim 1, wherein the plurality of electrical pulses has an average amplitude that is at least four times the average amplitude of the electrical signal, and wherein the second collective area is at least four times as large as the first collective area.

8. The method of claim 1, wherein the plurality of electrical pulses comprises a plurality of rectangular pulses with a 50% duty cycle.

9. The method of claim 1, wherein the step of applying the plurality of electrical pulses between the at least one first electrode element and the at least one second electrode element induces an electric field in the target region that provides an anti-tumor effect.

10. The method of claim 1, wherein the step of applying the plurality of electrical pulses between the at least one first electrode element and the at least one second electrode element induces an electric field in the target region that increases the permeability of the subject's blood-brain-barrier.

11. The method of claim 1, wherein the at least one first electrode element comprises a first subset of a first array of electrode elements, wherein the at least one second electrode element comprises a second subset of a second array of electrode elements, and wherein the second subset contains at least twice as many electrode elements as the first subset.

12. The method of claim 1, wherein the plurality of electrical pulses has a waveform that collectively resembles a rectified sinusoid.

13. The method of claim 1, wherein the plurality of electrical pulses has a waveform that collectively resembles an offset sinusoid.

14. An apparatus for treating a target region of a subject's body with an electric field, the apparatus comprising:
a signal generator configured to output a plurality of electrical pulses between at least one first electrode element and at least one second electrode element, wherein the plurality of electrical pulses has a polarity such that the at least one first electrode element operates as an anode and the at least one second electrode element operates as a cathode,
wherein the signal generator is further configured to output an electrical signal between the at least one first electrode element and the at least one second electrode element, the electrical signal having a polarity such that the at least one first electrode element operates as a cathode and the at least one second electrode element operates as an anode, wherein the electrical signal charge-balances the plurality of electrical pulses, and wherein the electrical signal has an average amplitude, and
wherein the plurality of electrical pulses has an average amplitude that is at least twice the average amplitude of the electrical signal,
wherein the plurality of electrical pulses has a pulse repetition rate between 50,000 and 1,000,000 pulses per second, and
wherein the plurality of electrical pulses has a waveform that collectively resembles (i) a sequence of rectangular pulses with a 50% duty cycle, (ii) a rectified sinusoid, or (iii) an offset sinusoid.

15. The apparatus of claim 14, further comprising the at least one first electrode element and the at least one second electrode element,
wherein the at least one first electrode element and the at least one second electrode element are configured for positioning on or in the subject's body on opposite sides of the target region, wherein the at least one first electrode element has a first collective area, and wherein the at least one second electrode element has a second collective area that is at least twice as large as the first collective area.

16. The apparatus of claim 15, wherein the plurality of electrical pulses has an average amplitude that is at least four times the average amplitude of the electrical signal, and
wherein the second collective area is at least four times as large as the first collective area.

17. The apparatus of claim 16, wherein the plurality of electrical pulses comprises at least 1000 groups of electrical pulses, with each group including at least 1000 electrical pulses, with breaks having a duration of at least 10 ms disposed between adjacent groups, and wherein the signal generator is configured to output the electrical signal during the breaks.

18. The apparatus of claim 17, wherein the signal generator is configured not to output the electrical signal during intervals of time that lie between adjacent pulses within a given group of electrical pulses.

19. The apparatus of claim 17, wherein the signal generator is configured to also output the electrical signal during intervals of time that lie between adjacent pulses within a given group of electrical pulses.

20. The apparatus of claim 14, wherein the plurality of electrical pulses comprises a plurality of rectangular pulses with a 50% duty cycle.

21. The apparatus of claim 14, wherein the at least one first electrode element comprises a first subset of a first array of electrode elements, wherein the at least one second electrode element comprises a second subset of a second array of electrode elements, and wherein the second subset contains at least twice as many electrode elements as the first subset.

22. The apparatus of claim 14, wherein the plurality of electrical pulses has a waveform that collectively resembles a rectified sinusoid.

23. The apparatus of claim 14, wherein the plurality of electrical pulses has a waveform that collectively resembles an offset sinusoid.

* * * * *